(12) United States Patent
Menning et al.

(10) Patent No.: US 10,160,186 B2
(45) Date of Patent: Dec. 25, 2018

(54) COEXTRUDED MULTILAYER FILM WITH FILLER IN TRANSPORT LAYER

(71) Applicant: Dow Global Technologies LLC, Midland, MI (US)

(72) Inventors: Bruce A. Menning, Midland, MI (US); Robert L. McGee, Midland, MI (US); Patrick Chang Dong Lee, South Burlington, VT (US); Rajen M. Patel, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 153 days.

(21) Appl. No.: 15/505,426

(22) PCT Filed: Aug. 25, 2015

(86) PCT No.: PCT/US2015/046680
§ 371 (c)(1),
(2) Date: Feb. 21, 2017

(87) PCT Pub. No.: WO2016/033034
PCT Pub. Date: Mar. 3, 2016

(65) Prior Publication Data
US 2017/0239921 A1    Aug. 24, 2017

Related U.S. Application Data

(60) Provisional application No. 62/041,991, filed on Aug. 26, 2014.

(51) Int. Cl.
*B32B 27/08* (2006.01)
*B32B 27/30* (2006.01)
(Continued)

(52) U.S. Cl.
CPC ............. *B32B 27/08* (2013.01); *B32B 27/20* (2013.01); *B32B 27/205* (2013.01);
(Continued)

(58) Field of Classification Search
None
See application file for complete search history.

(56) References Cited

U.S. PATENT DOCUMENTS

| 3,557,265 A | 1/1971 | Chisolm et al. |
| 3,565,985 A | 2/1971 | Schrenk et al. |

(Continued)

FOREIGN PATENT DOCUMENTS

| EP | 0311423 A2 | 4/1989 |
| JP | 2003-145659 A | 5/2003 |

(Continued)

*Primary Examiner* — Catherine S Branch
(74) *Attorney, Agent, or Firm* — Husch Blackwell LLP

(57) ABSTRACT

The present disclosure provides a coextruded multilayer film. The coextruded multilayer film includes a core component having from 10 to 1000 alternating layers of layer A and layer B. Layer A has a thickness from 30 nm to 1000 nm and includes a polymer selected from an ethylene/a-olefin copolymer, an ethylene vinyl acetate polymer (EVA), an ethylene methyl-acrylate copolymer (EMA), an ethylene n-butyl acetate polymer (EnBA), and combinations thereof. Layer B has a thickness from 30 nm to 1000 nm. Layer B is a blend composed of (i) a polymer selected from an ethylene-based polymer, an EVA, an EMA, an EnBA, and combinations thereof, and (ii) a particulate filler material. The core component has a water vapor transmission rate from 50 to less than 500 g-mil/m2/24 hr and a carbon dioxide transmission rate from 50,000 to 300,000 cc-mil/m2/24 hr/atm.

12 Claims, 2 Drawing Sheets

(51) Int. Cl.
  *B32B 27/32* (2006.01)
  *B32B 27/20* (2006.01)
(52) U.S. Cl.
  CPC .......... *B32B 27/306* (2013.01); *B32B 27/308* (2013.01); *B32B 27/32* (2013.01); *B32B 2307/724* (2013.01); *B32B 2410/00* (2013.01); *B32B 2439/70* (2013.01)

(56) References Cited

U.S. PATENT DOCUMENTS

| | | |
|---|---|---|
| 3,884,606 A | 5/1975 | Schrenk et al. |
| 4,842,791 A | 6/1989 | Gould et al. |
| 4,909,971 A | 3/1990 | Coughlin et al. |
| 5,094,788 A | 3/1992 | Schrenk et al. |
| 5,094,793 A | 3/1992 | Schrenk et al. |
| 5,695,868 A | 12/1997 | McCormack |
| 6,261,674 B1 | 7/2001 | Branham et al. |
| 6,685,872 B2 | 2/2004 | Dooley et al. |
| 7,993,739 B2 | 8/2011 | Barger et al. |
| 8,562,885 B2 | 10/2013 | Dooley et al. |
| 9,481,143 B2 | 11/2016 | Dooley et al. |
| 2007/0084083 A1 | 4/2007 | Hazenberg et al. |
| 2009/0087654 A1 | 4/2009 | Ling et al. |
| 2009/0142530 A1 | 6/2009 | Visioli et al. |
| 2009/0169853 A1 | 7/2009 | Chang et al. |
| 2010/0143703 A1 | 6/2010 | Baer et al. |
| 2011/0293802 A1 | 12/2011 | Alfaro et al. |
| 2012/0288695 A1 | 11/2012 | Jenkins et al. |
| 2013/0291729 A1 | 11/2013 | Baer et al. |

FOREIGN PATENT DOCUMENTS

| | | | |
|---|---|---|---|
| JP | 2003-335904 A | 11/2003 | |
| WO | 00/76765 A1 | 12/2000 | |
| WO | WO-2012153214 A2 * | 11/2012 | ............. B32B 27/08 |

* cited by examiner

COEXTRUDED MULTILAYER FILM WITH FILLER IN TRANSPORT LAYER

BACKGROUND

The present disclosure is directed to a multilayer film with a core component containing particulate filler material, the multilayer film suitable for MAP.

Improving the quality and the shelf life of fresh produce and fresh cut produce has long been an objective of the food industry. Technologies such as controlled atmosphere storage (CA), modified atmosphere packaging (MAP), and ripening control technologies such as ethylene absorbers and ethylene antagonists (1-MCP) have been developed and are selectively used to achieve extended produce shelf life and improved produce quality. Understanding of biological variation such as fruit type, variety, maturity, growing region, and climatic response are key when selecting the appropriate technology for packaging, storing, and transporting produce.

Most produce incurs significant damage from fungus and mold when the moisture level inside a package is too high and condensation occurs. Most produce incurs significant damage when the moisture level inside a package is too low and dehydration resulting in shrivel occurs. Most produce generates carbon dioxide ($CO_2$) as it ripens and consumes oxygen ($O_2$). Most produce incurs damage when the $CO_2$ level in the package becomes too high (typically above 5%). Thus, the art recognizes the challenge in producing a MAP-package for produce that achieves desired levels of transmission for four gasses—$O_2$, $CO_2$, ethylene, and 1-MCP and simultaneously maintains suitable water permeability.

Conventional monolithic MAP has shortcomings. Conventional MAP typically provides one desired permeation feature at the sacrifice of other permeation or transport features. MAP films made from polymers with high water solubility such as nylon or polylactic acid have high water transmission rates and are often used for produce that is moisture sensitive. These polymers typically are good barriers to other gases such as carbon dioxide, oxygen, ethylene, and 1-MCP which can be harmful in some the applications. Moreover, these high water solubility polymers are expensive relative to polyolefins.

On the other hand, MAP films made from polyolefins typically have good transmission of ethylene and carbon dioxide but have low water transmission rate. The olefin polymers are typically low cost and also offer good toughness, transparency, heat sealing, and processability.

Perforation also has shortcomings. Although perforation (either micro-perforation or macro-perforation) can increase the oxygen transmission into the produce package, it requires additional processing steps and additional processing equipment, therefore adding energy and cost to the film. In addition, perforations may increase oxygen transmission for a film but they do not provide significant amounts of water transport unless the perforations are very large (~3 microns or greater). Perforations also move less carbon dioxide than oxygen at equivalent driving forces due to the higher molecular weight and slower diffusion of carbon dioxide (Graham's law). Perforations can create a natural carbon dioxide accumulation in produce packages made from low carbon dioxide transport films such as nylon, for example.

A need exists for a film capable of balancing transmission of one or more gasses in conjunction with maintaining water permeability suitable for produce packaging applications. A need further exists for a produce packaging film with suitable $CO_2$ transmission, the ability to transmit ethylene and 1-MCP, while simultaneously providing controlled water permeability to enable the benefits of the MAP environment.

SUMMARY

The present disclosure is directed to a coextruded multilayer film with a core component that is a nanolayer structure. The nanolayer structure provides the multilayer film with a balance of transmission properties—and a balance of water vapor transmission rate (WVTR) and $CO_2$ transmission rate ($CO_2TR$) in particular.

In an embodiment, a coextruded multilayer film is provided and includes a core component. The core component includes from 10 to 1000 alternating layers of layer A and layer B. Layer A has a thickness from 30 nm to 1000 nm. Layer A includes a polymer selected from an ethylene/$\alpha$-olefin copolymer, an ethylene vinyl acetate polymer (EVA), an ethylene methyl-acrylate polymer (EMA), an ethylene n-butyl acetate polymer (EnBA), and combinations thereof. Layer B includes a blend composed of (i) a polymer selected from an ethylene-based polymer, an EVA, an EMA, an EnBA, and combinations thereof, and (ii) a particulate filler material. The core component has a water vapor transmission rate (WVTR) from 50 to less than 500 g-mil/$m^2$/24 hr and a carbon dioxide transmission rate ($CO_2TR$) from 50,000 to 300,000 cc-mil/$m^2$/24 hr/atm.

BRIEF DESCRIPTION OF THE DRAWING

The accompanying Figures together with the following description serve to illustrate and provide a further understanding of the disclosure and its embodiments and is incorporated in and constitutes a part of this specification.

DEFINITIONS

Figure 1:
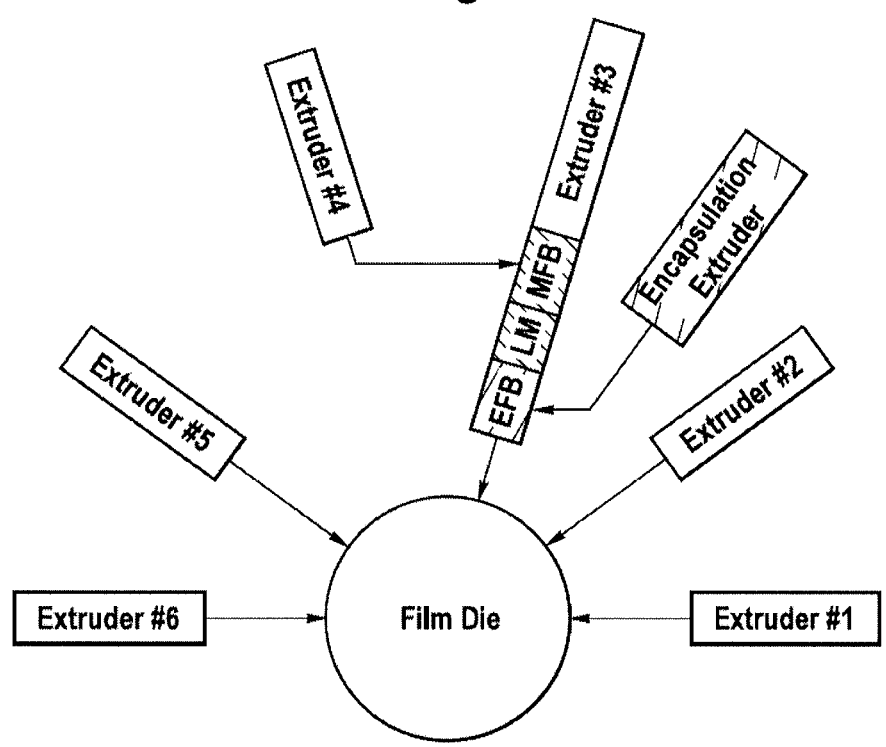
FIG. 1 is a schematic diagram illustrating a method for making a multilayer film in accordance with an embodiment of the present disclosure.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

The term "composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

An "ethylene-based polymer" is a polymer that contains more than 50 mole percent polymerized ethylene monomer (based on the total amount of polymerizable monomers) and, optionally, may contain at least one comonomer.

As used herein, the term "film", including when referring to a "film layer" in a thicker article, unless expressly having the thickness specified, includes any thin, flat extruded or cast thermoplastic article having a generally consistent and uniform thickness up to about 0.254 millimeters (10 mils). "Layers" in films can be very thin, as in the cases of nanolayers discussed in more detail below.

As used herein, the term "sheet", unless expressly having the thickness specified, includes any thin, flat extruded or cast thermoplastic article having a generally consistent and uniform thickness greater than "film", generally at least 0.254 millimeters thick and up to about 7.5 mm (295 mils) thick. In some cases sheet is considered to have a thickness of up to 6.35 mm (250 mils).

Either film or sheet, as those terms are used herein can be in the form of shapes, such as profiles, parisons, tubes, and the like, that are not necessarily "flat" in the sense of planar but utilize A and B layers according to the present disclosure and have a relatively thin cross section within the film or sheet thicknesses according to the present disclosure.

"An interpolymer" is a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Melting Point" (Tm) is the extrapolated onset of melting and is determined by DSC as set forth in the "Test Methods" section.

"Crystallization temperature" (Tc) is the extrapolated onset of crystallization and is determined by DSC as set forth in the "Test Methods" section.

"Glass transition temperature" (Tg) is determined from the DSC heating curve as set for in the "Test Methods" section.

A "nanolayer structure," as used herein, is a multilayer structure having two or more layers each layer with a thickness from 1 nanometer to 900 nanometers.

An "olefin-based polymer," as used herein, is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

"A polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/α-olefin polymer" and "propylene/α-olefin polymer" are indicative of interpolymers as described below prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight.

DETAILED DESCRIPTION

The present disclosure provides a multilayer film. In an embodiment, a coextruded multilayer film is provided and includes a core component. The core component includes from 10 to 1000 alternating layers of layer A and layer B. Layer A has a thickness from 30 nm to 1000 nm and includes a polymer selected from an ethylene/α-olefin copolymer, an ethylene vinyl acetate polymer (EVA), an ethylene methyl-acrylate copolymer (EMA), an ethylene n-butyl acetate polymer (EnBA), and combinations thereof. Layer B has a thickness from 30 nm to 1000 nm. Layer B is a blend composed of (i) a polymer selected from an ethylene-based polymer, an EVA, an EMA, an EnBA, and combinations thereof, and (ii) a particulate filler material. The core component has a water vapor transmission rate (WVTR) from 50 to less than 500 g-mil/meter$^2$ (m$^2$)/24 hour (hr) and a carbon dioxide transmission rate (CO$_2$TR) from 50,000 to 300,000 cc-mil/m$^2$/24 hr/atmosphere (atm).

A. Layer A

The core component of the present multilayer film includes from 10 to 1000 alternating layers of layer A and layer B. Layer A includes a polymer selected from an ethylene/α-olefin copolymer, an ethylene vinyl acetate polymer, an ethylene methyl-acrylate copolymer (EMA), an ethylene n-butyl acetate polymer (EnBA), and combinations thereof.

1. Ethylene Vinyl Acetate

The layer A can include ethylene vinyl acetate polymer. Ethylene vinyl acetate (also known as EVA) is the copolymer of ethylene and vinyl acetate. The weight percent vinyl acetate usually varies from 7 wt % to 40 wt %, with the remainder being ethylene.

In an embodiment, the EVA has one, some, or all of the following properties:

a vinyl acetate content from 8 wt %, or 10 wt %, or 12 wt %, or 14 wt % to 16 wt %, or 18 wt %, or 20 wt %, or 22 wt %, or 24 wt % or 26 wt %, or 28 wt %, or 30 wt %;

a density from 0.930 g/cc, or 0.940 g/cc, or 0.950 g/cc to 0.960 g/cc, or 0.965 g/cc; and a melt index (MI) from 0.1 g/10 min, or 0.2 g/10 min, or 0.3 g/10 min, or 0.4 g/10 min to 0.5 g/10 min, or 0.6 g/10 min, or 0.7 g/10 min, or 0.8 g/10 min, or 0.9 g/10 min, or 1.0 g/10 min.

2. EMA

The layer A can include an ethylene methyl-acrylate polymer. Ethylene methyl-acrylate polymer (EMA) is the copolymer of ethylene and methyl-acrylate. Ethylene methyl-acrylate polymer can have from 6 wt % to 32 wt % methyl-acrylate ester (MA) content.

In an embodiment, the EMA has one, some, or all of the following properties:

a methyl-acrylate content from 10 wt %, or 12 wt %, or 14 wt %, or 15 wt % to 16 wt %, or 18 wt %, or 20 wt %, or 22 wt %, or 24 wt % or 26 wt %, or 29 wt %;

a density from 0.920 g/cc, or 0.925 g/cc, or 0.930 g/cc to 0.940 g/cc, or 0.950 g/cc, or 0.955 g/cc; and a melt index (MI) from 0.1 g/10 min, or 0.2 g/10 min, or 0.3 g/10 min, or 0.5 g/10 min, or 0.8 g/10 min, or 1.0 g/10 min, or 3.0 g/10 min, or 5.0 g/10 min to 7.0 g/10 min, or 9.0 g/10 min, or 10.0 g/10 min.

3. EnBA

The layer A can include an ethylene n-butyl acrylate polymer. Ethylene n-butyl acrylate polymer (EnBA) is the copolymer of ethylene and n-butyl acrylate. Ethylene n-butyl acrylate polymers can have from 4 wt % to 32 wt % butyl acrylate ester (BA) content.

In an embodiment, the ethylene n-butyl acrylate polymer has, one, some, or all of the following properties:

a BA content from 15 wt %, or 17 wt %, or 19 wt %, or 21 wt %, to 23 wt %, or 25 wt % or 27 wt %, or 28 wt %;

a density from 0.920 g/cc, or 0.925 g/cc to 0.930 g/cc, or 0.935 g/cc; and a melt index (MI) from 0.1 g/10 min, or 0.2 g/10 min, or 0.3 g/10 min, or 0.5 g/10 min, or 0.8 g/10 min, or 1.0 g/10 min, or 3.0 g/10 min, or 5.0 g/10 min to 7.0 g/10 min, or 9.0 g/10 min, or 10.0 g/10 min.

4. Ethylene/α-Olefin Copolymer

The layer A can include ethylene/α-olefin copolymer. In an embodiment, the α-olefin comonomer is a $C_3$-$C_8$ α-olefin selected from propylene, 1-butene, 1-hexene, or 1-octene.

In an embodiment the ethylene/α-olefin copolymer is an ethylene/octene copolymer and can be a polyolefin elastomer (POE) or a polyolefin plastomer (POP) with a density less than 0.905 g/cc, or less than 0.902 g/cc, or less than 0.897 g/cc or less than 0.885 g/cc, or less than 0.863 g/cc and a melt index from 1 g/10 min, or 5 g/10 min, or 10 g/10 min, or 15 g/10 min to 20 g/10 min, or 25 g/10 min, or to about 30 g/10 min. Blends of two or more POE or POP may also be utilized for the ethylene/α-olefin copolymer. Nonlimiting examples of suitable ethylene/α-olefin copolymer include ENGAGE™ 8100, ENGAGE™ 8440, AFFINITY™ PF-1140G, and combinations thereof, each available from The Dow Chemical Company.

In an embodiment, the ethylene/α-olefin copolymer is an enhanced polyethylene (EPE) resin such as ELITE™ Enhanced Polyethylene Resin with a density from 0.911 g/cc, or 0.912 g/cc, or 0.913 g/cc, or 0.914 g/cc to 0.915 g/cc, or 0.916 g/cc, or 0.918 g/cc, or 0.920, or 0.926 g/cc and a melt index from 0.85 g/10 min, or 1.0 g/10 min, or 2.0 g/10 min to 3.0 g/10 min, or 4.0 g/10 min, or 5.0 g/10 min. Nonlimiting examples of suitable ethylene/α-olefin copolymer include ELITE™ 5500G, ELITE™ 5400G and combinations thereof, available from The Dow Chemical Company, and combinations with other ethylene/α-olefin copolymers.

In an embodiment, the ethylene/α-olefin copolymer is a linear low density polyethylene (LLDPE). In an embodiment, the ethylene/α-olefin copolymer is a linear low density polyethylene with a density from 0.910 g/cc, or 0.915 g/cc, or 0.917 g/cc to 0.930 g/cc, or 0.935 g/cc, or 0.940 g/cc. A nonlimiting example of a suitable LLDPE is DOWLEX™ 2247G, available from The Dow Chemical Company.

B. Layer B

The core component of the present multilayer film includes from 10 to 1000 alternating layers of layer A and layer B. Layer B has a thickness from 30 nm to 1000 nm. Layer B is composed of a blend that includes (i) a polymer selected from an ethylene-based polymer, an EVA, an EMA, an EnBA, and combinations thereof, and (ii) a particulate filler material.

1. Ethylene-Based Polymer

An "ethylene-based polymer" is a polymer that contains more than 50 mole percent polymerized units derived from ethylene monomer (based on the total amount of polymerizable monomers) and, optionally, may contain one or more comonomers.

In an embodiment, the ethylene-based polymer is an ethylene homopolymer.

In an embodiment, the ethylene-based polymer is an ethylene/α-olefin copolymer as described above with respect to layer A.

2. EVA/EMA/EnBA

The EVA, EMA and EnBA can be any respective EVA, EMA and EnBA as described above.

C. Particulate Filler Material

One or both layers A and/or layer B can include the particulate filler material. In an embodiment, the layer B includes a particulate filler material. The particulate filler material creates discontinuity in the layers to provide additional pathways for water vapor to move through the multilayer film.

The particulate filler material is present in layer B in an amount from 30 wt %, or 40 wt %, or 50 wt % to 60 wt %, or 70 wt %, or 80 wt % based on the total weight of layer B. The particulate filler material has an average particle size, D50, from 0.5 microns, or 1.0 micron, or 1.5 microns, or 1.6 microns, or 2.0 microns, or 3.0 microns, or 4.0 microns, or 5.0 microns to 6.0 microns, or 7.0 microns, or 8.0 microns, or 9.0 microns, or 10.0 microns. The term "D50," as used herein, is the median particle diameter such that 50% of the sample weight is above the stated particle diameter. In a further embodiment, the particulate filler material has an average particle size, D90, from 0.5 microns, or 1.0 microns, or 1.5 microns, or 1.6 microns, or 2.0 microns, or 3.0 microns, or 4.0 microns, or 5.0 microns to 6.0 microns, or 7.0 microns, or 8.0 microns, or 9.0 microns, or 10.0 microns. The term "D90," as used herein, is the median particle diameter such that 90% of the sample weight is above the stated particle diameter.

Nonlimiting examples of suitable particulate filler material includes metal oxides, metal hydroxides, metal carbonates, metal sulfates, various kinds of clay, silica, alumina, powdered metals, glass microspheres, calcium carbonate, barium sulfate, sodium carbonate, magnesium carbonate, magnesium sulfate, barium carbonate, kaolin, carbon, calcium oxide, magnesium oxide, aluminum hydroxide, titanium dioxide, talc, mica, wollastonite latex particles, particles of thermoplastic elastomers, pulp powders, wood powders, cellulose derivatives, chitin, chitozan powder, microbial cellulose, powders of highly crystalline, high melting polymers, beads of highly crosslinked polymers, organosilicone powders, and powders of super absorbent polymers, such as polyacrylic acid, and the like, as well as combinations and derivatives thereof.

In an embodiment, the particulate filler material is precipitated silica, micronized silica gel, synthetic silica gel, and combinations thereof such as materials sold under the tradename Sylobloc, available from Grace Materials Technologies.

Properties of some nonlimiting examples of suitable particulate filler material are provided in Table 1 below.

TABLE 1

| Particulate filler material units | Median Particle size (D50) μm | Specific Pore volume ml/g | Oil absorption g/100 g | pH | Material |
|---|---|---|---|---|---|
| Sylobloc 45 | 4.4-5.4 | 1.0 | 200 | 3.0-4.3 Note low pH b/c 45 includes citric acid | synthetic amorphous $SiO_2$ from silica gel, micronized |
| Sylobloc 47 | 5.5-6.7 | 1.0 | 200 | 6.0-8.0 | synthetic amorphous $SiO_2$ from silica gel, micronized |
| Sylobloc 44 | 4.3-5.5 | 1.6 | 300 | 6.0-8.0 | synthetic amorphous $SiO_2$ from silica gel, micronized |
| Sylobloc P05 | 5.0 | — | 85 | 6.0-8.0 | synthetic amorphous $SiO_2$ from precipitate |
| Diatomaceous earth | 11 | — | 130 | 10 | mined crystalline $SiO_2$ |
| Minbloc HC1400* | 7.6 | — | 31 | 9.9 | nepheline syenite |
| $CaCO_3$ | 21 | — | 20 | 9.0-9.5 | mined limestone |

*Available from The Sibelco Group

In an embodiment, layer B is formed from a polymer composition that is a composite of an ethylene-based polymer and a particulate filler material. A nonlimiting example is a composite of linear low density polyethylene (LLDPE) and $CaCO_3$ and sold by Ampacet Corporation.

D. Core Component

The core component of the present multilayer film includes from 10 to 1000 alternating layers of layer A and layer B.

In an embodiment, the core component includes from 10, or 15, or 30, or 33, or 50, or 60, or 65, or 70, or 100, or 106, or 108, or 110, or 114, or 116, or 129, or 145, or 150, or 200 to 250, or 257, or 300, or 400, or 450, or 500, or 1000 alternating layers of layer A and layer B.

The thickness of layer A and layer B can be the same or different. In an embodiment, the thickness of layer A is the same, or substantially the same, as the thickness of layer B. Layer A has a thickness from 10 nm, or 20 nm, or 30 nm, or 50 nm, or 70 nm, or 80 nm, or 100 nm, or 145 nm, or 150 nm, or 198 nm, or 200 nm, or 250 nm, or 290 nm, or 300 nm, or 350 nm, or 396 nm, or 400 nm, or 450 nm to 500 nm, or 600 nm, or 700 nm, or 792 nm, or 800 nm, or 900 nm, or 1000 nm. Layer B has a thickness from 10 nm, or 20 nm, or 30 nm, or 50 nm, or 70 nm, or 80 nm, or 100 nm, or 145 nm, or 150 nm, or 198 nm, or 200 nm, or 250 nm, or 290 nm, or 300 nm, or 350 nm, or 396 nm, or 400 nm, or 450 nm to 500 nm, or 600 nm, or 700 nm, or 792 nm, or 800 nm, or 900 nm, or 1000 nm.

The number of A layers and B layers present in the core component can be the same or different. In an embodiment, the A:B layer ratio (number of A layers to the number of B layers) is from 1:1, or 3:1 to 9:1.

In an embodiment, the core component includes 100 to 110, or 108 alternating layers of layer A and layer B and the core component has an A:B layer ratio from 50:50, or 75:25 to 90:10. Layer A has a thickness from 30 nm, or 100 nm, or 200 nm to 400 nm, or 500 nm.

The core component may be produced with a multilayer coextrusion apparatus as illustrated in FIG. 1. The feedblock for a multi-component multilayer system usually combines the polymeric components into a layered structure of the different component materials. The starting layer thicknesses (their relative volume percentages) are used to provide the desired relative thicknesses of the A and B layers in the final film.

The present core component is a two component structure composed of polymeric material "A" (produces layer A) and polymeric material "B" (produces layer B) and is initially coextruded into a starting "AB" or "ABA" or "ABABA" or any variation of alternating layered feedstream configuration where "A" represents layer A and "B" represents layer B. Then, known layer multiplier techniques can be applied to multiply and thin the layers resulting from the feedstream. Layer multiplication is usually performed by dividing the initial feed stream into 2 or more channels and "stacking" of the channels. The general formula for calculation of the total numbers of layers in a multilayer structure using a feedblock and repeated, identical layer multipliers is: $N_t=(N_I)(F)^n$ where: $N_t$ is the total number of layers in the final structure; $N_I$ is the initial number of layers produced by the feedblock; F is the number of layer multiplications in a single layer multiplier, usually the "stacking" of 2 or more channels; and n is number of identical layer multiplications that are employed.

For multilayer structures of two component materials A and B, a three layer ABA initial structure is frequently employed to result in a final film or sheet where the outside layers are the same on both sides of the film or sheet after the layer multiplication step(s). Where the A and B layers in the final film or sheet are intended to be generally equal thickness and equal volume percentages, the two A layers in the starting ABA layer structure are half the thickness of the B layer but, when combined together in layer multiplication, provide the same layer thickness (excepting the two, thinner outside layers) and comprise half of the volume percentage-wise. As can be seen, since the layer multiplication process divides and stacks the starting structure multiple times, two outside A layers are always combined each time the feedstream is "stacked" and then add up to equal the B layer thickness. In general, the starting A and B layer thicknesses (relative volume percentages) are used to provide the desired relative thicknesses of the A and B layers in the final film. Since the combination of two adjacent, like layers appears to produce only a single discrete layer for layer counting purposes, the general formula $N_t=(2)^{(n+1)}+1$ is used for calculating the total numbers of "discrete" layers in a multilayer structure using an "ABA" feedblock and repeated, identical layer multipliers where $N_t$ is the total number of layers in the final structure; 3 initial layers are produced by the feedblock; a layer multiplication is division into and stacking of 2 channels; and n is number of identical layer multiplications that are employed.

A suitable two component coextrusion system (e.g., repetitions of "AB" or "ABA") has two single screw extruders connected by a melt pump to a coextrusion feedblock. The melt pump controls the two melt streams that are combined in the feedblock as two or three parallel layers in a multilayer feedstream. Adjusting the melt pump speed varies the relative layer volumes (thicknesses) and thus the thickness ratio of layer A to layer B. From the feedblock, the feedstream melt goes through a series of multiplying elements. It is understood that the number of extruders used to pump melt streams to the feedblock in the fabrication of the structures of the disclosure generally equals the number of different components. Thus, a three-component repeating segment in the multilayer structure (ABC . . . ), requires three extruders.

Examples of known feedblock processes and technology are illustrated in WO 2008/008875; U.S. Pat. No. 3,565,985; U.S. Pat. No. 3,557,265; and U.S. Pat. No. 3,884,606, each of which is hereby incorporated by reference herein. Layer multiplication process steps are shown, for example, in U.S. Pat. Nos. 5,094,788 and 5,094,793, hereby incorporated herein by reference, teaching the formation of a multilayer flow stream by dividing a multilayer flow stream containing the thermoplastic resinous materials into first, second and optionally other substreams and combining the multiple substreams in a stacking fashion and compressing, thereby forming a multilayer flow stream. As may be needed depending upon materials being employed for film or sheet production and the film or sheet structures desired, films or sheet comprising two or more layers of the multilayer flow stream can be provided by encapsulation techniques such as shown by U.S. Pat. No. 4,842,791 encapsulating with one or more generally circular or rectangular encapsulating layers stacked around a core; as shown by of U.S. Pat. No. 6,685,872 with a generally circular, non-uniform encapsulating layer; and/or as shown by WO 2010/096608A2 where encapsulated multilayered films or sheet are produced in an annular die process. U.S. Pat. Nos. 4,842,791 and 6,685,872 and WO 2010/096608A2 are hereby incorporated by reference herein.

Figure 2:
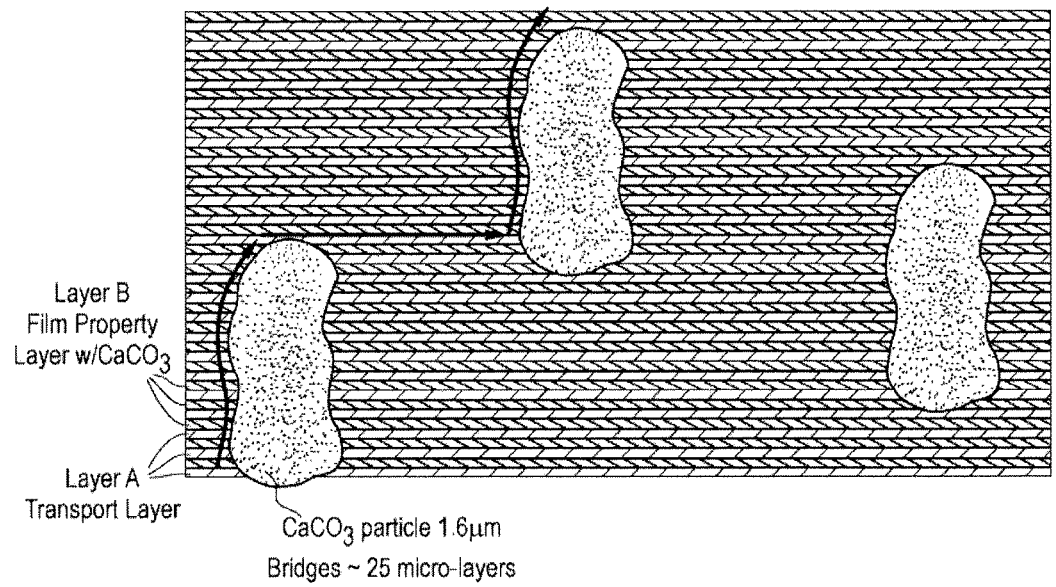
FIG. 2 is a schematic representation of a core component in accordance with an embodiment of the present disclosure.
Figure 3:
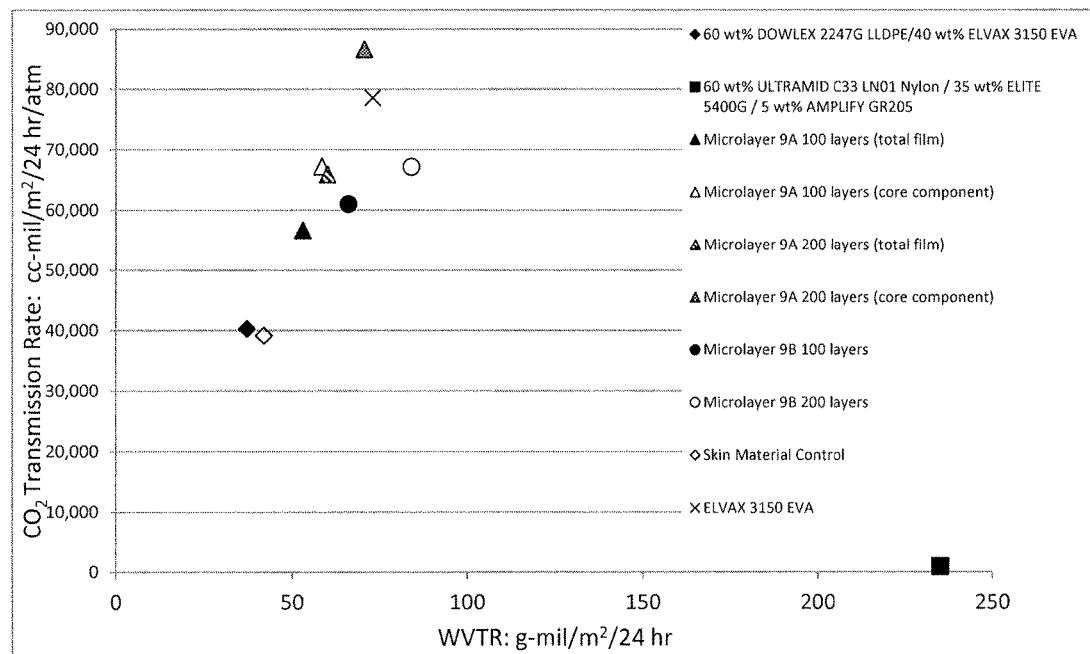
FIG. 3 is a graph showing $CO_2TR$ and WVTR for multilayer films in accordance with embodiments of the present disclosure.

The particulate filler material enhances water vapor permeability of the multilayer film. In an embodiment and as shown in FIG. 2, the layer thickness for each of layer A and layer B is comparable or smaller than the average particle size for the particulate filler material. Bounded by no particular theory, it is believed the particulate filler material creates discontinuity in the layers to provide additional pathways for water vapor to move through the film. Particulate filler material can also enhance the ability of the microlayer film to absorb or immobilize fluid.

In an embodiment, the core component includes from 100 to 200 alternating layers of layer A and layer B. Layer A has a thickness from 30 nm, or 100 nm to 400 nm, or 500 nm and includes an EVA as disclosed above. Layer B includes a blend containing (i) EVA and LLDPE and (ii) a particulate filler material that is $CaCO_3$.

In an embodiment, the multilayer film includes layer A with a thickness from 100 nm to 400 nm and includes an ethylene vinyl acetate polymer having vinyl acetate (VA) content of from 10 wt % to 20 wt %, a density from 0.930 g/cc to 0.950 g/cc and a melt index from 0.3 g/10 min to 1.0 g/10 min. Layer B has a thickness from 100 nm to 400 nm and includes a blend of EVA, linear low density polyethylene (LLDPE) and $CaCO_3$. The core component has a WVTR from 50, or 100, or 150 to 200, or 250, or 300 g-mil/m$^2$/24 hr and a $CO_2$TR from 50,000, or 60,000, or 70,000, or 80,000 to 90,000, or 100,000 cc-mil/m$^2$/24 hr/atm.

The core component may comprise two or more embodiments disclosed herein.

In an embodiment, the core component has a total thickness from 10 microns to 1000 microns. In a further embodiment, the core component has a thickness from 10, or 20, or 22, or 23, or 25, or 26, or 30, or 40, or 50, or 100, or 150, or 200, or 250 to 300, or 350, or 400, or 450, or 500 microns.

The core component may comprise two or more embodiments disclosed herein.

E. Skin Layers

In an embodiment, the multilayer film includes at least one skin layer. In a further embodiment, the multilayer film includes two skin layers. The skin layers are outermost layers, with a skin layer on each side of the core component. The skin layers oppose each other and sandwich the core component. The composition of each individual skin layer may be the same or different as the other skin layer. The thickness of each skin layer may be the same or different. Nonlimiting examples of suitable polymers that can be used as skin layers include ethylene-based polymers, propylene-based polymers, polyethylene oxide, polycaprolactone, polyamides, polyesters, polyvinylidene fluoride, polystyrene, polycarbonate, polymethylmethacrylate, polyamides, ethylene-co-acrylic acid copolymers, polyoxymethylene and blends of two or more of these; and blends with other polymers comprising one or more of these.

In an embodiment, the skin layers include propylene-based polymer, ethylene-based polymer, ethylene homopolymer, ethylene/α-olefin copolymer, propylene homopolymer, propylene/α-olefin copolymer, polyamide, polystyrene, polycarbonate and polyethylene-co-acrylic acid copolymers.

In an embodiment, the skin layers comprise a polymer used in layer A or a blend of a layer A polymer with another ethylene-based polymer.

In an embodiment, skin layers contain a POP resin such as AFFINITY PF 1140G, AFFINITY VP 8770G1, an EVA resin such as ELVAX® 3135 and ELVAX® 3150, and combinations thereof.

In an embodiment, the skin layers include a filler. The filler can be any filler described above, such as $CaCO_3$.

In an embodiment, the skin layers contain an ethylene/α-olefin copolymer such as an LLDPE, an EVA resin such as ELVAX® 3150 and combinations thereof. In an embodiment, each skin layer contains 60 wt % of an LLDPE and 40 wt % of an EVA, based on the total weight of each respective skin layer.

In an embodiment, the skin layers contain an ethylene/α-olefin copolymer such as an LLDPE, an EVA resin such as ELVAX® 3150, and a filler such as $CaCO_3$. In an embodiment, each skin layer contains 30 wt % of an LLDPE, 30 wt % of an EVA, and 40 wt % of a filler, based on the total weight of each respective skin layer.

The thickness of each skin layer may be the same or different. The two skin layers have a thickness from 5%, or 10%, or 15%, or 16% to 20%, or 30%, or 35% the total volume of multilayer film.

In an embodiment, the thickness of the skin layers is the same. The two skin layers with the same thickness are present in the multilayer film in the volume percent set forth above. For example, a multilayer film with 35% skin layer indicates each skin layer is present at 17.5% the total volume of the multilayer film.

In an embodiment, at least one skin layer includes a propylene-based polymer.

F. Optional Other Layer

The skin layers may be in direct contact with the core component (no intervening layers). Alternatively, the multilayer film may include one or more intervening layers between each skin layer and the core component. The present multilayer film may include optional additional layers. The optional layer(s) may be intervening layers (or internal layers) located between the core component and the skin layer(s). Such intervening layers (or internal layers) may be single, repeating, or regularly repeating layer(s). Such optional layers can include the materials that have (or provide) sufficient adhesion and provide desired properties to the films or sheet, such as tie layers, barrier layers, skin layers, etc.

Nonlimiting examples of suitable polymers that can be employed as tie or adhesive layers include: olefin block copolymers such as propylene-based block copolymer sold under the Tradename INTUNE™ (The Dow Chemical Company) and ethylene-based block copolymer sold under the Tradename INFUSE™ (The Dow Chemical Company); polar ethylene copolymers such as copolymers with vinyl acetate, acrylic acid, methyl-acrylate, and ethyl acrylate; ionomers; maleic anhydride-grafted ethylene polymers and copolymers; blends of two or more of these; and blends with other polymers comprising one or more of these.

Nonlimiting examples of suitable polymers that can be employed as barrier layers include: polyethylene terephthalate, ethylene vinyl alcohol, polyvinylidene chloride copolymers, polyamides, polyketones, MXD6 nylon, blends of two or more of these; and blends with other polymers comprising one or more of these.

As noted above, the multilayer film according to the present disclosure can be advantageously employed as a component in thicker structures having other inner layers that provide structure or other properties in the final article. For example, the skin layers can be selected to have an additional desirable properties such as toughness, printability and the like. The skin layers are advantageously employed on either side of the core component to provide multilayer films suitable for packaging and many other applications where their combinations of moisture barrier, gas barrier, physical properties and low cost will be well suited. In another aspect of the present disclosure, tie layers can be used with the multilayer film or sheet structures according to the present disclosure.

G. Multilayer Film

The present multilayer film can be a stand-alone film or can be a component of another film, a laminate, a sheet, or an article.

The present multilayer film may be used as films or sheets for various known film or sheet applications or as layers in thicker structures and to maintain light weight and low costs.

When employed in this way in a laminate structure or article with outer surface or skin layers and optional other inner layers, the present multilayer film can be used to provide at least 5 volume % of a desirable film or sheet, including in the form of a profile, tube, parison or other laminate article, the balance of which is made up by up to 95 volume % of additional outer surface or skin layers and/or inner layers.

In an embodiment, the present multilayer film provides at least 10 volume %, or at least 15 volume %, or at least 20 volume %, or at least 25 volume %, or at least 30 volume % of a laminate article.

In an embodiment, the present multilayer film provides up to 100 volume %, or less than 80 volume %, or less than 70 volume %, or less than 60 volume %, or less than 50 volume % of a laminate article.

In an embodiment, the multilayer film includes the core component and skin layers. The core component can be any core component discussed above. Each skin layer is composed of various polymers which are common in multilayer packaging applications, i.e., heat seal layer, mechanical property layer, etc. Layer A has a thickness from 100 nm to 400 nm and includes a polymer selected from an ethylene alpha-olefin copolymer, an ethylene vinyl acetate polymer, an ethylene methyl-acrylate polymer (EMA), an ethylene n-butyl acetate polymer (Embay), and combinations thereof. Layer B has a thickness from 100 nm to 400 nm and includes a blend composed of (i) a polymer selected from an ethylene-based polymer, an EVA, an EMA, an EnBA, and combinations thereof, and (ii) a particulate filler material. The multilayer film has a $CO_2TR$ from 50,000 to 300,000 cc-mil/m$^2$/24 hr/atm. The multilayer film also has a WVTR from 50 to 500 g-mil/m$^2$/24 hr. In a further embodiment, the core component is from 75% to 65% of the total multilayer film volume and the skin layers are from 25% to 35% of the total multilayer film volume.

In an embodiment, the multilayer film includes the core component and skin layers. The core component has from 100 to 120 alternating layers of layer A and layer B. Layer A has a thickness from 100 nm to 400 nm and includes an ethylene vinyl acetate polymer. Layer B has a thickness from 100 nm to 400 nm and includes a blend of EVA, linear low density polyethylene (LLDPE) and a particulate filler material such as calcium carbonate. Each skin layer is composed of a blend of LLDPE and EVA. The multilayer film has a WVTR from 50, or 60, or 70 to 75, or 80, or 85, or 90, or 95, or 99, or 100 g-mil/m$^2$/24 hr and a $CO_2TR$ from 50,000, or 55,000, or 60,000, or 70,000 to 80,000, or 90,000, or 99,000, or 100,000 cc-mil/m$^2$/24 hr/atm.

In an embodiment, the multilayer film includes the core component and skin layers. The core component has from 200 to 220 alternating layers of layer A and layer B. Layer A and layer B each has a thickness from 100 nm to 400 nm. Layer A includes an ethylene vinyl acetate polymer. Layer B includes a blend of EVA, LLDPE, and a particulate filler material, such as calcium carbonate. Each skin layer is composed of a blend of EVA, LLDPE, and a particulate filler material such as calcium carbonate. The multilayer film has a WVTR from 60, or 65, or 70, or 75, or 80, or 85, or 90, or 95, or 99, or 100 g-mil/m$^2$/24 hr, and a $CO_2TR$ from 60,000, or 65,000, or 70,000, or 75,000, or 80,000 to 85,000, or 90,000, or 95,000, or 99,000, or 100,000 cc-mil/m$^2$/24 hr/atm.

In an embodiment, the multilayer film (with or without skin layers) has an overall thickness from 0.1 mil (2.54 micrometers), or 0.2 mil, or 0.5 mil, or 0.9 mil, or 1.0 mil, or 1.3 mil, or 1.5 mil, or 2.0 mil, or 2.5 mil, or 3.0 mil to 5.0 mil, or 10.0 mil (254 micrometers).

In an embodiment, the multilayer film (with or without skin layers) has a tensile elongation in the machine direction (MD) from 200%, or 250%, or 300%, or 350%, or 400% to 450% or 500%, or 550% or 600%, or 650%, or 700%, or 750%, or 800%. In an embodiment, the multilayer film (with or without skin layers) has a tensile elongation in the transverse direction (TD) from 200%, or 250%, or 300%, or 350%, or 400%, or 450% or 500%, or 550% to 600%, or 650%, or 700%, or 750%, or 800%, or 850%, or 900%.

In an embodiment, the multilayer film (with or without skin layers) has a tensile strength in the machine direction (MD) from 35 MPa, or 40 MPa, or 45 MPa, or 50 MPa, or 55 MPa, or 60 MPa to 65 MPa, or 70 MPa, or 75 MPa, or 80 MPa, or 85 MPa, or 90 MPa. In an embodiment, the multilayer film (with or without skin layers) has a tensile strength in the transverse direction (TD) from 35 MPa, or 40 MPa, or 45 MPa, or 50 MPa, or 60 MPa to 65 MPa, or 70 MPa, or 75 MPa, or 80 MPa, or 85 MPa, or 90 MPa.

In an embodiment, the multilayer film (with or without skin layers) has an Elmendorf Tear in the machine direction (MD) from 0.70 N/25 µm, or 0.75 N/25 µm, or 0.80 N/25 µm, or 0.85 N/25 µm, or 0.90 N/25 µm to 1.00 N/25 µm, or 1.25 N/25 µm, or 1.50 N/25 µm, or 1.75 N/25 µm, or 2.00 N/25 µm, or 2.25 N/25 µm, or 2.50 N/25 µm, or 2.75 N/25 µm, or 3.00 N/25 µm. In an embodiment, the multilayer film (with or without skin layers) has an Elmendorf Tear in the transverse direction (TD) from 2.00 N/25 µm, or 2.50 N/25 µm, or 2.75 N/25 µm, or 3.00 N/25 µm, or 3.25 N/25 µm, or 3.50 N/25 µm, or 3.75 N/25 µm to 4.00 N/25 µm, or 4.25 N/25 µm, or 4.50 N/25 µm, or 4.75 N/25 µm, or 5.00 N/25 µm, or 5.25 N/25 µm, or 5.50 N/25 µm, or 6.00 N/25 µm, or 6.25 N/25 µm, or 6.50 N/25 µm, or 6.75 N/25 µm, or 7.00 N/25 µm.

H. Article

The present disclosure provides an article. In an embodiment, the present multilayer film is a component of an article. Nonlimiting examples of suitable articles include laminate structures, die formed articles, thermoformed articles, vacuum formed articles, or pressure formed articles. Other articles include tubes, parisons, and blow molded articles such as bottles or other containers.

In an embodiment, the article is a container. The container includes the present multilayer film. The article also includes a produce item located in the container. The present multilayer film contacts the produce item. Nonlimiting examples of suitable containers include flexible containers such as a bag, a pouch composed of the present multilayer film, or a substrate (such as a tray or bowl) around/upon which the present multilayer film is wrapped. A "produce item," as used herein, is an agricultural food product that is a fruit, a vegetable, a grain, and combinations thereof.

In an embodiment, the produce item is a fresh produce item. A "fresh produce item," as used herein, is the produce item in the same state, or in substantially the same state, as when the produce item was harvested. The harvested produce item may or may not be subjected to a wash procedure or a cleaning procedure before being placed in the container.

In an embodiment, the article is a flexible container such as a package. The package includes a peel seal. The package includes the multilayer film. The present multilayer film is a component of the peel seal.

Test Methods

Percent crystallinity, melting temperature, Tm, crystallization temperature (Tc), and glass transition temperature (Tg), each is measured by way of Differential Scanning Calorimerty (DSC) as set forth below.

DSC

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the Equation below:

$$\% \text{ Crystallinity} = ((H_f)/292 \text{ J/g}) \times 100$$

The heat of fusion ($H_f$) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in B. Wunderlich in *Thermal Characterization of Polymeric Materials*, $2^{nd}$ edition, Academic Press, 1997, E. Turi ed., pgs 277 and 278.

Crystallization temperature, Tc, is determined from a DSC cooling curve as above except the tangent line is drawn on the high temperature side of the crystallization peak. Where this tangent intersects the baseline is the extrapolated onset of crystallization (Tc).

Glass transition temperature, Tg, is determined from the DSC heating curve where half the sample has gained the liquid heat capacity as described in B. Wunderlich in *Thermal Characterization of Polymeric Materials*, $2^{nd}$ edition, Academic Press, 1997, E. Turi ed., pg 278 and 279. Baselines are drawn from below and above the glass transition region and extrapolated through the Tg region. The temperature at which the sample heat capacity is half-way between these baselines is the Tg.

Density is measured in accordance with ASTM D 792 (grams per cubic centimeter (g/cc)).

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Tensile elongation is measured in the machine direction (MD) and the transverse direction (TD) in accordance with ASTM D638(%).

Tensile strength is measured in the machine direction (MD) and the transverse direction (TD) in accordance with ASTM D638 (megaPascal (MPa)).

Elmendorf tear is measured in the machine direction (MD) and the direction (TD) in accordance with ASTM D1922 (N/25 µm).

Moisture permeability is a normalized calculation performed by first measuring Water Vapor Transmission Rate (WVTR) for a given film thickness. WVTR is measured at 38° C., 100% relative humidity and 1 atm pressure are measured with a MOCON Permatran-W 3/31. The instrument is calibrated with National Institute of Standards and Technology certified 25 µm-thick polyester film of known water vapor transport characteristics. The specimens are prepared and the WVTR is performed according to ASTM F1249. Units for WVTR are g-mil/m²/24 hr.

$CO_2$ permeability is a normalized calculation performed by first measuring $CO_2$ Transmission Rate ($CO_2$TR) for a given film thickness. $CO_2$TR is measured at 23° C., 0% relative humidity and 1 atm pressure are measured with a MOCON PERMATRAN-C Model 4/41. The instrument is calibrated with National Institute of Standards and Technology certified Mylar film of known $CO_2$ transport characteristics. The specimens are prepared and the $CO_2TR$ is performed according to ASTM F2476. Units for $CO_2TR$ are cc-mil/m²/24 hr/atm.

Some embodiments of the present disclosure will now be described in detail in the following Examples.

EXAMPLES

1. Materials

Materials used for multilayer films are provided in Table 2 below.

TABLE 2

Materials

| Material | WVTR g-mil/m²/ 24 hr | $CO_2TR$ cc-mil/m²/ day/24 hr | Density g/cc | Melt Index g/10 min (@190° C.) |
|---|---|---|---|---|
| ELITE ™ 5400G (ethylene/octene copolymer) | 18.6 | — | 0.916 | 1.0 |
| ENGAGE ™ 8100 (ethylene/octene copolymer) | 101 | — | 0.870 | 1.0 |
| ENGAGE ™ 8440 (ethylene/octene copolymer) | 31 | 106,000 | 0.897 | 1.6 |
| DOWLEX 2247G LLDPE (ethylene/1-octene copolymer) | | | 0.917 | 2.3 |
| Elvax 3150 (15% VA) EVA | 73 | 78,600 | 0.94 | 2.5 |
| ULTRAMID C33 LN01 Nylon | 250-340 | 155-186 | 1.12 | |
| Metallocene PE (AFFINITY, ELITE) | 16-78 | 31,000-108,000 | | |
| AFFINITY PF 1140G (ethylene/octene copolymer) | 31 | 97,000 | 0.897 | 1.6 |
| AMPLIFY GR205 (maleic anhydride-grafted polyethylene) | | | 0.960 | 2.0 |
| Polycarbonate | 171 | 16,700 | | |
| Polymethyl-methacrylate (PMMA) | 124 | — | | |
| Polyurethane elastomer | 620-1160 | 7,000-25,600 | | |
| Polyvinyl Chloride (PVC) | 78-465 | 4,700-186,000 | | |
| Polyethylene Oxide copolymer | 153,000 | — | | |
| Poly(dimethylsiloxane) | 76,000 | >300,000 | | |
| Polylactic Acid | 354 | 10,500 | | |
| Polybutylene succinate (PBS) | 890 | ~2500 | | |

2. Multilayer Film Production

A and B nanolayers are created using Extruders 3 and 4 and subsequent layer multiplier(s) as shown in the FIG. 1. FIG. 1 is a schematic diagram showing the layout of seven extruders around a six layer die including an encapsulation extruder, an encapsulation feedblock (EFB), a layer multi-layer (LM), and a microlayer feedblock (MFB). Extruders 1, 2, 5, and 6 are used to add skin layers. Extruders 1 and 2 create inner skin layers of the annular film structure and Extruders 5 and 6 create outer skin layers of the overall film structure, i.e., skin layer from Extruder 1/skin layer from Extruder 2/[A and B nanolayers from Extruders from 3 and 4]/skin layer from Extruder 5/skin layer from Extruder 6.

The overall core component contains 108 layers and the overall multilayer film contains a core component, encapsulation layers, skin layers which add up to a total of 114 layers. Each individual layer A and layer B in the core component has a thickness in the range from 100 to 400 nm.

3. Multilayer Films

The composition, structure and properties of the multilayer films are provided in Table 3 below.

TABLE 3

| | Tensile Elongation (ASTM D 638) (MD/TD) | Tensile Strength, MPa (ASTM D 638) (MD/TD) | Elmendorf Tear, N/25 μm (ASTM D 1922) (MD/TD) |
|---|---|---|---|
| Microlayer 9A 100 layers | 477%/656% | 71.4/66.0 | 0.88/5.2 |
| Microlayer 9A 200 layers | 421%/647% | 61.3/61.8 | 0.87/4.6 |
| Microlayer 9B 100 layers | 484%/588% | 55.4/48.8 | 1.9/3.8 |
| Microlayer 9B 200 layers | 470%/555% | 53.0/43.4 | 1.6/2.8 |
| Skin Material Control | 566%/654% | 70.9/63.8 | 2.1/5.0 |

Microlayer 9A: 16 vol % skin/74 vol % core/10 vol % skin
skin = 60 wt % DOWLEX 2247G LLDPE + 40 wt % ELVAX 3150 EVA (skin material control)
core = 46 wt % ELVAX 3150 EVA transport layer & 28 wt % porous layer (40 wt % $CaCO_3$/30 wt % ELVAX 3150 EVA/30 wt % DOWLEX 2247G LLDPE)
Microlayer 9B: 16 vol % skin/74 vol % core/10 vol % skin
skin = 40 wt % $CaCO_3$/30 wt % ELVAX 3150 EVA/30 wt % DOWLEX 2247G LLDPE
core = 46 wt % ELVAX 3150 EVA transport layer & 28 wt % porous layer (40 wt % $CaCO_3$/30 wt % ELVAX 3150 EVA/30 wt % DOWLEX 2247G LLDPE)

The permeability properties for the multilayer films are provided in Table 4 below.

TABLE 4

| | WVTR g-mil/m²/24 hr | $CO_2TR$ cc-mil/m²/24 hr/atm | Thickness Micrometers (mils) |
|---|---|---|---|
| 60 wt % DOWLEX 2247G LLDPE/40 wt % ELVAX 3150 EVA | 37 | 40,300 | |
| 60 wt % ULTRAMID C33 LN01 Nylon/35 wt % ELITE 5400G/5 wt % AMPLIFY GR205 | 235 | 930 | |
| Microlayer 9A 100 layers (total film) | 53 | 56,655 | 34.3 (1.35) |
| Microlayer 9A 100 layers (core component) | 58.4* | 67,190* | 25.4 (1.00)* |
| Microlayer 9A 200 layers | 60 | 65,885 | 30.7 (1.21) |
| Microlayer 9A 200 layers (core component) | 70.6* | 86,640* | 22.7 (0.90)* |
| Microlayer 9B 100 layers | 66 | 60,987 | 68.1 (2.68) |
| Microlayer 9B 200 layers | 84 | 67,177 | 61.2 (2.41) |
| Skin Material Control | 42 | 39,173 | 68.3 (2.69) |
| ELVAX 3150 EVA | 73 | 78,600 | |

Microlayer 9A: 16 vol % skin/74 vol % core/10 vol % skin
skin = 60 wt % DOWLEX 2247G LLDPE + 40 wt % ELVAX 3150 EVA (skin material control)
core = 46 wt % ELVAX 3150 EVA transport layer & 28 wt % porous layer (40 wt % $CaCO_3$/30 wt % ELVAX 3150 EVA/30 wt % DOWLEX 2247G LLDPE)
Microlayer 9B: 16 vol % skin/74 vol % core/10 vol % skin
skin = 40 wt % $CaCO_3$/30 wt % ELVAX 3150 EVA/30 wt % DOWLEX 2247G LLDPE
core = 46 wt % ELVAX 3150 EVA transport layer & 28 wt % porous layer (40 wt % $CaCO_3$/30 wt % ELVAX 3150 EVA/30 wt % DOWLEX 2247G LLDPE)
*Calculated value WVTR and $CO_2TR$ are calculated for the core component as follows.

total film thickness (mil)/$P_{film}$=thickness (mil) of skin 1/$P_{skin1}$+thickness (mil) of multilayer core/$P_{core}$+thickness (mil) of skin 2/$P_{skin2}$ OR (the equivalent expression)

100 vol %/$P_{film}$=vol %$_{skin\ 1}$/$P_{skin\ 1}$+vol %$_{core}$/$P_{core}$+ vol %$_{skin2}$/$P_{skin2}$ Since Skin 1=Skin 2 this simplifies to $$100 \text{ vol \%}/P_{film} = \text{vol \%}_{skin}/P_{skin} + \text{vol \%}_{core}/P_{core}$$

OR (making volume fractions instead of vol % for simplicity and using Microlayer 9A/9B layers)

$$1/P_{film} = 0.26/P_{skin\ 1} + 0.74/P_{core}$$

Table 4 provides $P_{film}$ and $P_{skin\ 1}$ and enables calculation of WVTR and $CO_2TR$ for the core component.

Applicant discovered for produce packaging applications, it is advantageous to have the WVTR and $CO_2TR$ within specified boundaries simultaneously. Produce incurs significant damage from fungus and mold when the moisture level inside a package is too high and condensation occurs. In addition, produce incurs significant damage when the moisture level inside a package is too low such that desiccation and shrivel occurs. Most packaged produce generates $CO_2$ as it ripens (during shelf life, for example) and consumes $O_2$. But most produce incurs damage when the $CO_2$ level in the package becomes too high (typically above 5%). Hence the packaging must deliver adequate $CO_2$ transmission as well as adequate moisture transmission. Applicant discovered that the present multilayer film synergistically provides suitable WVTR and $CO_2TR$ to improve produce shelf life when the present multilayer film is used in produce packaging.

The present multilayer film with alternating A and B layers between 30 to 1000 nm with one layer containing a particulate filler material between 1 to 10 micron average size (D50) having WVTR of 50-500 g-mil/m²/24 hr and $CO_2TR$ of 50,000 to 300,000 cc-mil/m²/24 hr/atm, advantageously can be used as a produce bag that extends shelf life and reduces produce spoilage prior to consumption.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A coextruded multilayer film comprising:
   a core component comprising from 10 to 1000 alternating layers of layer A and layer B;
   layer A having a thickness from 30 nm to 1000 nm and comprising a polymer selected from the group consisting of an ethylene/α-olefin copolymer, an ethylene vinyl acetate polymer (EVA), an ethylene methylacrylate polymer (EMA), an ethylene n-butyl acetate polymer (EnBA), and combinations thereof;
   layer B comprising a blend composed of (i) a polymer selected from the group consisting of an ethylene-based polymer, an EVA, an EMA, an EnBA, and combinations thereof, and (ii) a particulate filler material; and
   the core component has a water vapor transmission rate (WVTR) from 50 to less than 500 g-mil/m²/24 hr and a carbon dioxide transmission rate ($CO_2TR$) from 50,000 to 300,000 cc-mil/m²/24 hr/atm.

2. The multilayer film of claim 1 wherein layer A has a thickness from 30 nm to 500 nm.

3. The multilayer film of claim 1 wherein layer B has a thickness from 30 nm to 500 nm.

4. The multilayer film of claim 1 wherein the core component comprises from 100 to 200 alternating layers of layer A and layer B.

5. The multilayer film of claim 1 wherein the core component has from 50 to 150 alternating layers of layer A and layer B and the film has a WVTR from 50 to 100 g-mil/m²/24 hr and a $CO_2TR$ from 50,000 to 100,000 cc-mil/m²/24 hr/atm.

6. The multilayer film of claim 1 wherein the particulate filler material has an average particle size, D50, from 1 micron to 10 microns.

7. The multilayer film of claim 1 comprising skin layers composed of a blend of ethylene vinyl acetate polymer and an ethylene-based polymer.

8. The multilayer film of claim 1 wherein the multilayer film has a WVTR from 50 to 100 g-mil/m²/24 hr and a $CO_2TR$ from 50,000 to 100,000 cc-mil/m²/24 hr/atm.

9. The multilayer film of claim 7 wherein the skin layer blend further comprises a filler.

10. The multilayer film of claim 9 wherein the multilayer film has a WVTR from 60 to 100 g-mil/m²/24 hr and a $CO_2TR$ from 60,000 to 100,000 cc-mil/m²/24 hr/atm.

11. An article comprising the multilayer film of claim 1.

12. The article of claim 11 wherein the article is a package and the multilayer film is a component of a peel seal.

* * * * *